United States Patent
Holca

[15] 3,680,701
[45] Aug. 1, 1972

[54] R. H. DUAL MEDIA FILTER

[72] Inventor: Radu Holca, Boulogne-Seine, France

[73] Assignee: Gulf Degremost, Inc., Liberty Corner, N.J.

[22] Filed: March 29, 1971

[21] Appl. No.: 128,715

Related U.S. Application Data

[63] Continuation-in-part of Ser. No. 805,407, March 10, 1969, abandoned.

[52] U.S. Cl. ............... 210/80, 210/274, 210/275, 210/284
[51] Int. Cl. ............................................. B01d 29/08
[58] Field of Search......... 210/73, 80, 274, 275, 283, 210/284, 289, 292

[56] References Cited

UNITED STATES PATENTS

| | | | |
|---|---|---|---|
| 1,057,328 | 3/1913 | Candy | 210/275 X |
| 1,797,709 | 3/1931 | Apeldorn | 210/289 X |
| 3,276,585 | 10/1966 | Kalinske | 210/80 |
| 3,335,868 | 8/1967 | Schiffers | 210/274 |
| 3,491,882 | 1/1970 | Elam | 210/73 |
| 3,510,003 | 5/1970 | Tart | 210/284 |

Primary Examiner—Samih N. Zaharna
Attorney—Browdy & Neimark

[57] ABSTRACT

A filter contains in a single housing a coarse granulation layer and at least one fine granulation layer downstream from the coarse-granulation layer so that liquid to be filtered passes downwardly through the coarse layer and then through the fine layer and backwash means are provided for passing the backwash upwardly through the fine layer and then the coarse layer.

17 Claims, 3 Drawing Figures

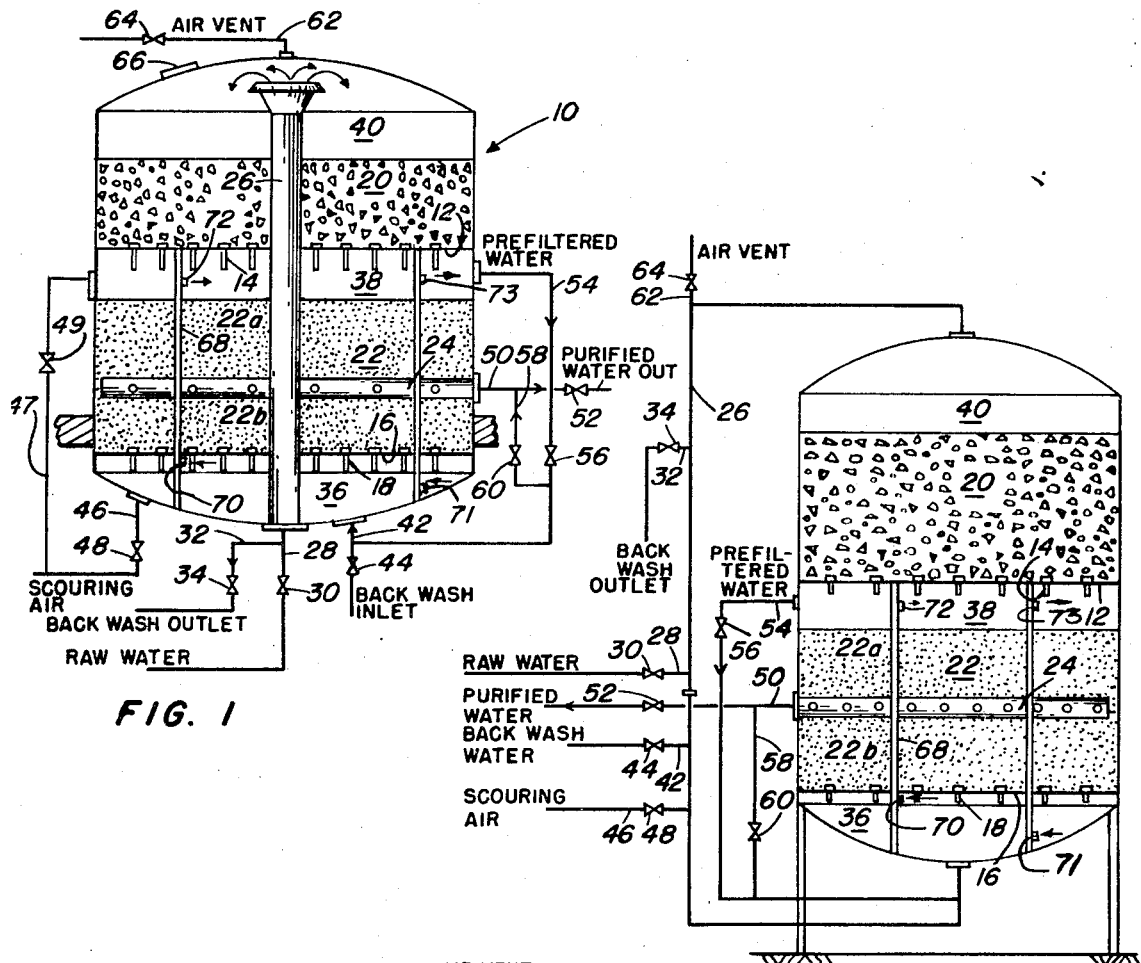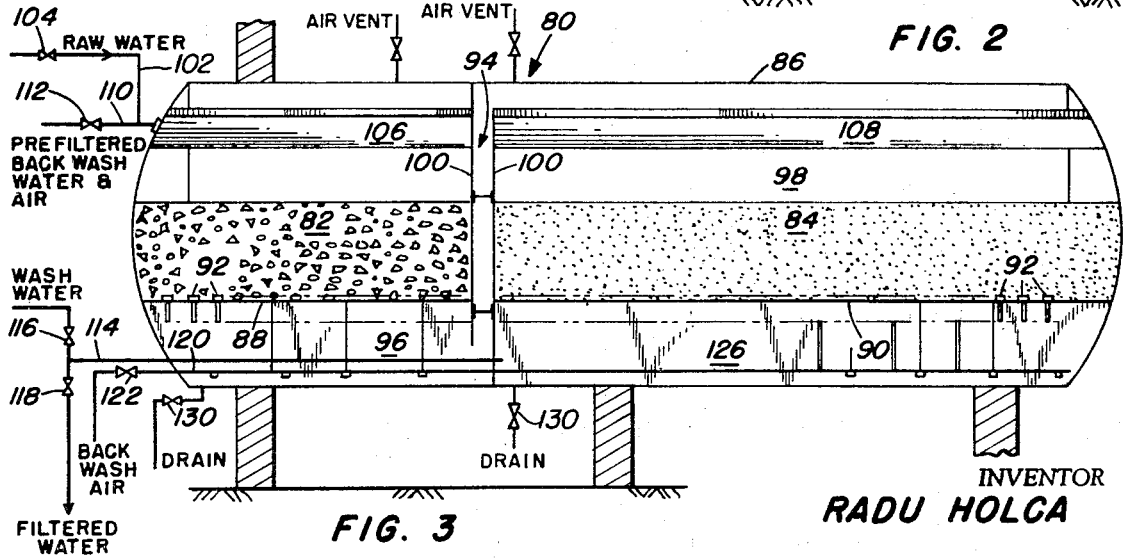

DUAL MEDIA FILTER

This application is a continuation-in-part of application Ser. No. 805,407 filed Mar. 10, 1969, now abandoned.

The present invention relates to an improved filter for raw water or other liquids and more particularly to a filter containing a coarse-granulation layer and a fine-granulation layer in an improved arrangement for efficient operation and backwashing.

Particular difficulty has been experienced in filtration when the liquid to be treated, water in particular, contains particles of different sizes. This requires filtration media adapted to these particular sizes.

A few decades ago, the concept of depth filtration was introduced. In this type of filtration, a large portion of the filtration bed is actively taking part in the filtration operation. In order to achieve depth filtration of a few inches, a filtering material of a size of about 1 mm has been used. The results have been very encouraging and many installations working on that principle are now in operation all over the world. Due to the density of this filtration medium, a system of backwashing with water and air has been applied. The efficiency of such a filter is substantially higher than that of a unit working on the surface filtration principle. Furthermore, the quantities of backwash water (consequently, loss of water and increase in waste) are considerably reduced. Up to 50 percent reduction in wash water has been experienced over the units which employ surface filtration techniques.

A few years ago, a new filtration technique was started. This was the principle of using two filtration media of different densities in the same filter. Due to cost considerations these materials generally are: anthracite (1.5 to 2 m/m in size) on top of a sand bed (about 0.5 m/m in size).

In these filters, a depth filtration occurs in the anthracite bed and essentially a surface filtration in the sand bed.

These filters, as well as the filters with a single bed of uniform size as previously described, allow, under certain conditions, filtration of raw water without the use of a clarifier. When a clarifier is used, operation is often expensive, as chemical treatment must also often be provided to coagulate and settle the suspended solids. If chemical treatment is not used in the clarifier, a much larger unit must be provided.

The major problem encountered in dual-bed filters of the anthracite-sand type is in the backwashing operation. The density of anthracite, being lower than that of sand (1.4 compared to 2.4), presents some difficulties, when washing with air and water simultaneously. The particles to be removed have a density which is very close to that of the anthracite or even higher, for instance in steel mills and sometimes in paper mills. (The above densities are based on a water density of one). This causes washing out of the anthracite unless very expensive precautions are taken. If, however, in an anthracite-sand filter, backwashing if first with air alone for a period of time followed by a water (rinse) step, excessive quantities of backwash water are required. This is necessary to reclassify the two layers of media in respect to their density differentials.

Accordingly, it is an object of the present invention to provide an improved method and apparatus for dual bed filtration of liquids.

It is a further object of the present invention to provide an improved filter which can treat raw surface water and industrial wastes without prior clarification and with a substantial reduction in the consumption of backwash water.

Other objects and the nature and advantages of the present invention will be apparent from the following description taken in conjunction with the attached drawing in which:

FIG. 1 shows diagrammatically a filter structure according to the present invention;

FIG. 2 shows diagrammatically a filter structure in accordance with a modified form of the invention; and FIG. 3 likewise shows diagrammatically a filter structure in accordance with a further modified form of the invention.

Referring to FIG. 1, there is shown a filter structure 10 including an upper pre-filtration bed support 12 through which are installed a plurality of nozzles 14. The nozzles 14 are arranged at about 3 to 5 per square foot. A second bed support 16 similar to 12 is installed at a lower point in the filter; the second bed support also is provided with a plurality of nozzles 18. The upper support carries a coarse bed of gravel 20, for example, having a grain size which is dependent upon the characteristics of the water to be treated and of the required quality of the treated water. In general, the grain size will be about 1.5 to 2 mm., up to 4–6 mm for certain applications.

The second support 16 carries a fine bed of sand 22, for example, with a grain size of 0.6 mm or 1.2 – 1.3 mm depending upon the gravel size used.

In the mid-portion of the sand bed 22 is embedded a header-lateral collection system 24.

Centrally located and entering at the bottom of the filter is a pipe 26 which extends upwardly to a point above the gravel bed 20. The pipe 26 connects at its lower end to a pipe 28 controlled by a valve 30 and also to a pipe 32 controlled by a valve 34. The upper end of the pipe 26 is open.

The filter is provided with a space 36 below the lowermost bed, a space 38 between the lower and upper beds, and a space 40 above the upper bed 20. A pipe 42 controlled by a valve 44 and a pipe 46 controlled by a valve 48 are connected to the space 36. The header 24 is connected outside of the side wall of the filter to a pipe 50 provided with a valve 52 therein. A pipe 54 is connected to the space 38 in the filter at one end and to the pipe 42 at its other end and is provided with a valve 56 therein. A pipe 58 having a valve 60 therein connects the pipes 50 and 54. A pipe 47 is also connected to the space 38 and at its other end to the pipe 46 and is provided with a valve 49 therein. A pipe 62 provided with a valve 64 is connected to the space 40 and serves as an air vent. A manhole 66 is also located above the space 40.

A plurality of pipes 68 are provided which add to the rigidity of the internal structure of the filter. Some of the pipes 68 are provided with a first calibrated orifice 70 located in the space 36 immediately below the bed support 16 and a second calibrated orifice in the space 38, thereby connecting the two spaces as will be described more fully later. Some of the pipes 68 are provided with a lower first calibrated orifice 71 located in the space 36 near the bottom wall of the casing and a second calibrated orifice in the space 38, thereby connecting the two spaces for a purpose to be described.

In addition to the structure, the invention pertains to the method of operation of the filter. In operation, the liquid to be filtered is uniformly distributed onto the space 40 by flowing through the open valve 30, pipes 28 and 26 and thence onto the space 40. The liquid flows downwardly through the gravel bed 20 and thence through the nozzles 14 to the space 38. The liquid at this point is called pre-filtered liquid.

The pipe 54 and open valve 56 permit about half the flow of pre-filtered liquid to be transferred from space 38 to space 36 in the bottom portion of the filter. Thus, about one-half of the pre-filtered liquid flows downwardly in upper fine-granulation bed 22a and about one-half flows upwardly in lower fine granulation bed 22b. The filtered water is collected by the header 24 and flows out through pipe 50 and open valve 52. During the filtration period all other valves are closed.

The filtration speed per square foot of surface is twice as high in the gravel as in the sand. Thus, the square feet of surface of sand is maintained at twice that of the gravel. The gravel bed acts to produce a screening effect.

When the filter beds require backwashing, the washing is accomplished by an upward flow and consists of a first stage of washing with water and air followed by a second stage of rinsing with water.

During the first stage, backwash water is introduced at the rate of about 6 gpm/square ft., or more, depending on the size of the sand, through pipe 42 and open valve 44. Air at the rate of 6 cfm/sq. ft. is introduced through pipe 46 and open valve 48. The water and air collect in the space 36 below the second support 16 and a separation of the water and air occurs. The air occupies a layer of about 3–4 inches immediately below the second support 16 and the remainder of the space 36 is filled with water. The orifice 70 opens into this air space, whereas the nozzle 71 opens into the lower water space.

The nozzles 18 and 14 each have a relatively long stem of about 7 inches having a slot extending upwardly about 4 inches from the bottom, the stem being open at its bottom part. Thus, air will pass through the slots and become mixed with the water flowing upwardly through the open bottom of the nozzles. This mixture will then flow upwardly through the sand and wash and filtering medium in an exceptionally efficient way.

Water and air will then reach the space 38. Similarly the gravel bed 20 will be washed by a mixture of water and air. However, in the gravel bed 20, a larger flow of air and/or water is required than in the sand bed. To provide this excess of air into the space 38 below the gravel bed, air is permitted to flow through the calibrated orifices 70, 72 to allow about 20–25 percent of the total flow to be transferred from the space 36 to the space 38. Water is permitted to flow thru the calibrated orifices 71 and 73 from the space 36 to the space 38.

Either in place of the orifices and pipes 68, or supplemental thereto, additional air can be conducted to the space 38 thru pipe 47 when valve 49 is open. Additional water can be conducted to the space 38 thru pipe 54 when valve 56 is open.

The dirty water and air will reach the space 40 and is collected through the pipes 26 and 32 and open valve 34.

After 6–7 minutes, the inlet air valves 48 and 49 are closed, and the inlet backwash water valves 44 and 56 are kept open. Rinsing with water alone continues at a rate of about 10–12 gpm/sq. ft. for about 8–10 minutes. After washing the filter is put back into filtration as previously described.

The periods of washing and filtration can be determined by measuring the turbidity of the water.

The pipe 58 and valve 60 permits a backwash from time to time of the header collector system 24.

FIG. 2 shows a different valving and piping arrangement which is useful when the filter is indoors. The arrangement of FIG. 1 is useful when the top part of the filter is located outside and only the bottom part is inside a building.

The reference numerals of FIG. 1 are used in FIG. 2 to show comparable parts. The operation of FIG. 2 is identical to that as described for FIG. 1.

The plurality of filters of the type illustrated can be operated under pressure in parallel, and the service effluent of one can be re-directed to provide pressurized wash-rinse water for the unit being cleaned. This would eliminate the need for backwash pumps and related piping and valving.

Since the flow of backwash water is at about 6 gpm/sq. ft. whereas the rinse water flows at about 10–12 gpm/sq. ft., one backwash pump can be used for backwashing where two pumps can be used for the rinsing step. The valve 34 can be provided with two fixed openings; one for backwashing and the other for rinsing.

The filter illustrated in FIG. 3 is a horizontal type filter 80 wherein the coarse granulation bed 82 and the fine granulation bed 84 are located side-by-side. The closed cylindrical shell 86 includes a coarse granulation filter bed support 88 and a fine granulation filter bed support 90 both of which are provided with nozzles 92 as heretofore described located about 3–5 per sq. ft. The pre-filtering zone at the left of the housing 86 is separated from the filtering zone at the right of the housing 86 by an area 94 which connects the bottom space 96 of the pre-filtering zone with the upper space 98 of the filtering zone. The area 94 may be formed by a piping conduit or by two parallel plates 100 as shown in FIG. 3. The location of the parallel plates 190 may be adjustable so that the relative surface areas of the two beds can be adjusted as desired.

The filter bed support 88 supports a bed of gravel 82 of a grain size of 1.5 to 2 mm. for certain applications and a size of 4–6 mm for other applications. The filter bed support 90 supports a bed of sand 84 wherein the grain size can vary between 0.6 mm and 1.3–1.5 mm. The type and size of gravel and sand used is a function of the type of raw liquid to be treated and the desired suspended solids content in the treated water.

The filter bed of sand 84 in the filtering zone at the right side of the housing 86 has a surface area which is about twice as large as the corresponding surface area of the filter bed 82 in the pre-filtration zone. This corresponds to a filtration speed per square foot of surface which is twice as great in the gravel as in the sand. However, the relative surface ratios can be changed according to the specific conditions of the filtration.

A pipe 102 controlled by a valve 104 enters at the top of the pre-filtration zone for raw water feed. A distribution channel 106 is located at the top of the pre-filtration zone, and a distribution channel 108 is located at the top of the filtering zone. A pile 110 controlled by valve 112 is also connected to the top of the pre-filtration zone for removal of backwash water and air.

A pipe 114 controlled by valves 116 and 118 connects with the lower portion of the filtering zone. A pipe 120 controlled by valve 122 conducts air into the lower portion of the filtering zone.

In operation, during filtration, the liquid to be filtered is introduced into the housing 86 through open valve 104 and pipe 102 whence it is uniformly distributed over the surface of the filter bed 82 through the distribution channel 106. The liquid then flows through the gravel bed 82 and the nozzles 92 to reach the bottom space 96. The pre-filtered liquid will then flow through the conduit area 94 upwardly to the space 98 and the distribution channel 108 whence it is uniformly distributed over the surface of the sand bed 84. The liquid flows through the sand and the nozzles 92 to reach the lower space 126. From the space 126 the filtered water is collected through the pipe 114 and the open valve 118, valve 116 being closed. During this operation, all other valves are closed.

When the filter beds require washing, the pre-filter bed 82 and the filter bed 84 are washed in an upflow manner which is exactly the reverse of the downflow during filtration. The washing operation consists of a first step of washing with water and air and a second step of rinsing with water.

During the first step, the backwash water is introduced through open valve 116 (valve 118 being closed) and pipe 114 at a rate of about 6 gpm/sq. ft. or more according to the grain size of the sand and gravel, to space 126 below the filter bed support 90. Backwash air at a rate of approximately 6 cfm/sq. ft. is introduced at the same time through open valve 122 and pipe 120 to the space 126 under the filter bed support 90.

When both water and air reach the space 126, a separation occurs with the air occupying a layer of about 3–4 inches just below the support 90, while the remainder of the space 126 is filled with water. The nozzles 92 are similar to those described in connection with FIG. 1 permitting the air to enter through the slots to mix with water which flows into the bottom openings of the nozzle stems. The two fluids mix inside the nozzle and flow upwardly through the sand bed thus washing the filtration media very thoroughly and efficiently. The backwashing liquid as well as air collected in the space 98 above the bed 84 is conducted through channel 108 and conduit space 94 into space 96 just below the coarse granulation bed support 88. A similar washing operation occurs in the coarse granulation bed 82 and the backwash water and air are then discharged through channel 106, pipe 110 and open valve 112.

The washing of the filter bed in conducted so as to insure and expansion of the sand and the gravel in the range of 15 percent. This operation lasts about 7–8 minutes. The inlet valve 122 is now closed and inlet valve 116 remains open so that rinsing with water alone proceeds at a rate of about 10–12 gpm/sq. ft. The rinsing operation lasts from 7–8 minutes and can be controlled by the use of timers or by taking samples and measuring the turbidity of the water. After washing, the filter is put back into filtration as previously described.

Since the surface area of the fine granulation bed is approximately twice that of the coarse granulation bed, the rate of flow of the air and water per square feet thru the coarse granulation bed will be approximately twice the rate of flow per square feet thru the fine granulation bed. Additional outlets can be provided from pipes 96 and 120 below the coarse granulation bed 82 into the space 96 to permit additional backwash air and/or water to enter the coarse granulation bed.

It should be understood that the valves 116, 118 and 122 could be installed at the other end of the housing 86 if desired. The arrangement shown in FIG. 3 has the advantage of all valves being grouped on one side. The filter will also include a drain valve 130 as well as an air vent valves at the top of the filtration zones.

The forms of filter and their operation described heretofore have a number of advantages over those of the prior art. Raw surface water and industrial wastes can be treated without prior clarification and with or without flocculation using chemical reagents depending on the circumstances. The present invention is applicable in the case of direct filtration of liquid wastes from a steel mill scale pit and for the tertiary treatment of industrial wastes or sewage.

When compared with conventional filters, the filter in accordance with the present invention has a much larger capacity for retaining suspended matter since the unit consists of a combination of a pre-filter with a polishing filter where both filtration media are designed to insure a filtration in depth. Using the present invention, a much longer filtration service between two consecutive washing operations is obtained. Further, the chemical characteristics of the treated liquid remain unchanged. According to the present invention, filtration rates in the pre-filter are approximately twice as high as in the polishing filter. Pre-filtration has a screening effect and filtration rates can be 16–20 gpm/sq. ft. or higher. The capacity of the present filters for retaining oils is with the efficiency of 80–85 percent when the quantity of oil in the water to be treated is in the range of 35 to 40 ppm. This is typical in the filtration of steel mill scale pit liquid wastes.

The consumption of backwash water is substantially reduced in the present apparatus due to the following reasons:

a. The simultaneous introduction of water and air for the washing operation in the bi-filter is very efficient for the total mass of pre-filtration and filtration media.

b. Rinsing with water alone in order to eliminate the remaining suspended matter. The amount of rinse water is considerably less than in an anthracite-sand filter when air is followed by a rinse step.

c. Water which has been used to wash the polishing filter is reused to wash the pre-filter. Actually, it is the pre-filter which retains the largest part of the suspended matter and does not therefore require a perfectly clear water for washing.

d. Therefore, water which has been used for washing is much more concentrated in particles which have been retained during filtration. This will result in a substantial reduction in waste water. The consumption of wash water is in the range of 0.8 to 2 percent with respect to the total volume of filtered water. This is very low and is indicative of an efficient operation.

Although the filter according to this invention has been referred to as a water filter, it would not constitute a departure from the spirit and scope of this invention to operate the filter with fluids other than water, since the present invention is applicable to all fluids requiring a filtering treatment of the type obtained with a filter of this character.

WHAT IS CLAIMED IS:

1. A filter adapted for filtering liquids and subsequent backwashing with water and air comprising:

a housing;

a raw water inlet thereto;

an inlet for backwash water and air;

a coarse granulation bed in said housing located downstream (during filtration) from said raw-water supply inlet, and upstream (during filtration) from said backwash inlet for water and air, said raw water inlet being located above said coarse-granulation bed whereby said raw water flows downwardly through said coarse-granulation bed during filtration and said backwash water and air flows upwardly through said coarse-granulation bed;

means to support said coarse-granulation bed;

a plurality of nozzles passing through said coarse-granulation bed support means for the downward passage therethrough of pre-filtered liquid and for the upward passage therethrough of water and air during backwash, said nozzles extending downwardly below said support means whereby an air space is formed beneath said coarse-granulation bed support means during backwashing with water and air;

at least one fine-granulation bed downstream (during filtration) from said coarse-granulation bed and upstream (during filtration) from said backwash water and air inlet;

means to support said fine granulation bed forming a space between said coarse-granulation bed and said fine-granulation bed and a second space beneath said fine-granulation bed support means;

a plurality of nozzles passing through said fine-granulation bed support means for the upward passage therethrough of water and air during backwash, said nozzles extending downwardly below said support means whereby an air space is formed immediately beneath said fine granulation bed support means during backwashing with air and water;

a first draining device for removing the filtered water after it has passed through said fine-granulation bed;

whereby raw water to be filtered flows downwardly from said raw water inlet through said coarse-granulation bed, through said nozzles and into said space beneath said coarse granulation bed, and thence through said fine-granulation bed and out of said first draining device; and means for backwashing said filter beds with water and air including said backwash inlet for water and air downstream (during filtration) of said fine-granulation bed, and a backwash exit for water and air upstream (during filtration) of said coarse-granulation bed whereby backwash water and air flows during backwashing of the filter from said backwash inlet first through said fine-granulation bed and thence through said coarse-granulation bed in an upward direction.

2. A filter in accordance with claim 1 wherein the inlet surface area of the fine-granulation bed exposed to the pre-filtered raw-water supply is approximately twice as great as the surface area of the coarse-granulation bed exposed to the raw-water supply.

3. A filter in accordance with claim 1 wherein said coarse-granulation bed consists of gravel of grain size 1.5 to 6 mm and said fine-granulation bed consists of filtering sand having a grain size of about 0.6 – 1.3.

4. A filter in accordance with claim 1 further comprising means for conducting backwash water and air after passing through said fine-granulation bed to said coarse-granulation bed, and means for conducting additional backwash water and air to said coarse-granulation bed whereby a greater quantity of backwash per square foot of bed area can pass through said coarse-granulation bed than said fine-granulation bed.

5. A filter in accordance with claim 4 further comprising pipe means passing through said fine-granulation bed connecting said space above said fine-granulation bed to the space below said coarse-granulation bed; whereby an additional portion of backwash water and air can be conducted directly to said coarse-granulation bed without passing through said fine-granulation bed so that a greater quantity of backwash can pass through said coarse-granulation bed than through said fine-granulation bed.

6. A filter in accordance with claim 15 wherein the depth of said fine-granulation bed is greater than the depth of said coarse granulation bed.

7. A filter in accordance with claim 6 wherein said first draining device is located within said fine-granulation bed and means to feed pre-filtered water from said coarse-granulation bed simultaneously to the upper and lower surfaces of said fine-granulation bed whereby the water to be filtered flows in counterflow downwardly through the upper portion of said fine-granulation bed and upwardly through the lower portion of said bed to said first draining device.

8. A filter in accordance with claim 2 wherein said fine-granulation bed has an upper surface approximately twice as great as the upper surface of said coarse-granulation bed.

9. A filter in accordance with claim 8 wherein said coarse-granulation bed and said fine-granulation bed are side-by-side within said housing.

10. A filter adapted for filtering water and subsequent back washing with water and air comprising:

a horizontally extending housing;

a coarse-granulation bed in said housing located at one side of said housing, means to support said coarse-granulation bed, having a space therebeneath, said coarse-granulation bed having a space thereabove extending to the top of said housing;

a fine granulation bed in said housing located at the other side of said housing, said fine granulation bed having a greater surface area than said coarse granulation bed, means to support said fine-granulation bed having a space therebeneath, said fine granulation bed having a space thereabove extending to the top of said housing;

a first vertical plate extending downwardly from the top of said housing to a point slightly above the bottom thereof below said coarse-granulation bed support means, said plate forming the inner side wall of said coarse granulation bed;

a second vertical plate extending upwardly from the bottom of said housing to a point slightly below the top thereof and above said fine granulation bed upper surface, said plate forming the inner side wall of said fine granulation bed;

said first and second vertical plates being separated from one another to form a passageway area therebetween connecting a space below said coarse granulation bed with a space above said fine granulation bed; and inlets and outlets above said coarse granulation bed and below said fine granulation bed.

11. A filter in accordance with claim 10 wherein the position of said first and second vertical plates are adjustable whereby the relative surface areas of said coarse and fine granulation beds can be controlled.

12. A process for filtering raw water comprising passing said raw water downwardly through a coarse-granulation bed of a filter and thence through a separate fine-granulation bed of said filter, continuing said passing of raw water through the filter until backwashing is required, then stopping the passing of raw water, passing backwash water and air first through said fine-granulation bed and thence upwardly through said coarse-granulation bed, and passing an additional amount of air only through said coarse-granulation bed.

13. A process according to claim 12 wherein the water after passage downwardly through said coarse-granulation bed is divided and a first portion is passed downwardly from the upper surface through said fine-granulated bed and a second portion is passed upwardly from the lower surface through said fine-granulation layer with the combined portions of filtered water being removed from a central portion of said fine-granulated bed.

14. A process for filtering a liquid comprising passing said liquid downwardly thru a coarse granulation bed of a filter and thence thru a separate fine-granulation bed of said filter, continuing said passing of liquid through the filter until backwashing is required, then stopping the passing of liquid, passing backwash water and air first upwardly thru said fine-granulation bed and thence upwardly thru said coarse-granulation bed, and passing a greater rate of flow per sq. ft. of bed surface of backwash water and air thru said coarse-granulation bed than thru said fine-granulation bed.

15. A process for filtering according to claim 14 wherein after the passing of backwash water and air is discontinued, additional rinsing water is passed in the same direction as said backwash, and then the filtration step is started again.

16. A process for filtering a liquid in a dual filter having a separate coarse granulation bed supported on a plate overlying a separate fine granulation bed supported on a plate comprising passing said liquid downwardly thru said coarse granulation bed to obtain a pre-filtered stream;

separating said pre-filtered stream into two parts and passing one part downwardly from the top of said fine granulation bed and the other part upwardly from the bottom of said fine granulation bed;

collecting both filtered streams at an intermediate portion of said fine granulation bed and withdrawing it;

when backwashing is required, stopping the passing of said liquid;

passing backwash water and air upwardly thru said entire fine granulation bed and thence upwardly thru said coarse granulation bed, the rate of flow per sq. ft. of bed surface being maintained greater thru said coarse-granulation bed than thru said fine-granulation bed.

17. A process for filtering a liquid in a dual filter having a separate coarse granulation bed supported on a plate and fine-granulation bed supported on a plate in side-by-side relationship, comprising passing said liquid downwardly through said coarse granulation bed and thence downwardly through said fine-granulation bed, continuing said passing of liquid thru the filter until backwashing is required, then stopping the passing of said liquid, passing backwash water and air upwardly through said fine-granulation bed and thence upwardly through said coarse-granulation bed, the rate of flow per sq. ft. of bed surface being maintained greater thru said coarse-granulation bed than thru said fine-granulation bed.

* * * * *